(No Model.)
W. CLEMSON.
BICYCLE.
No. 316,009. Patented Apr. 21, 1885.
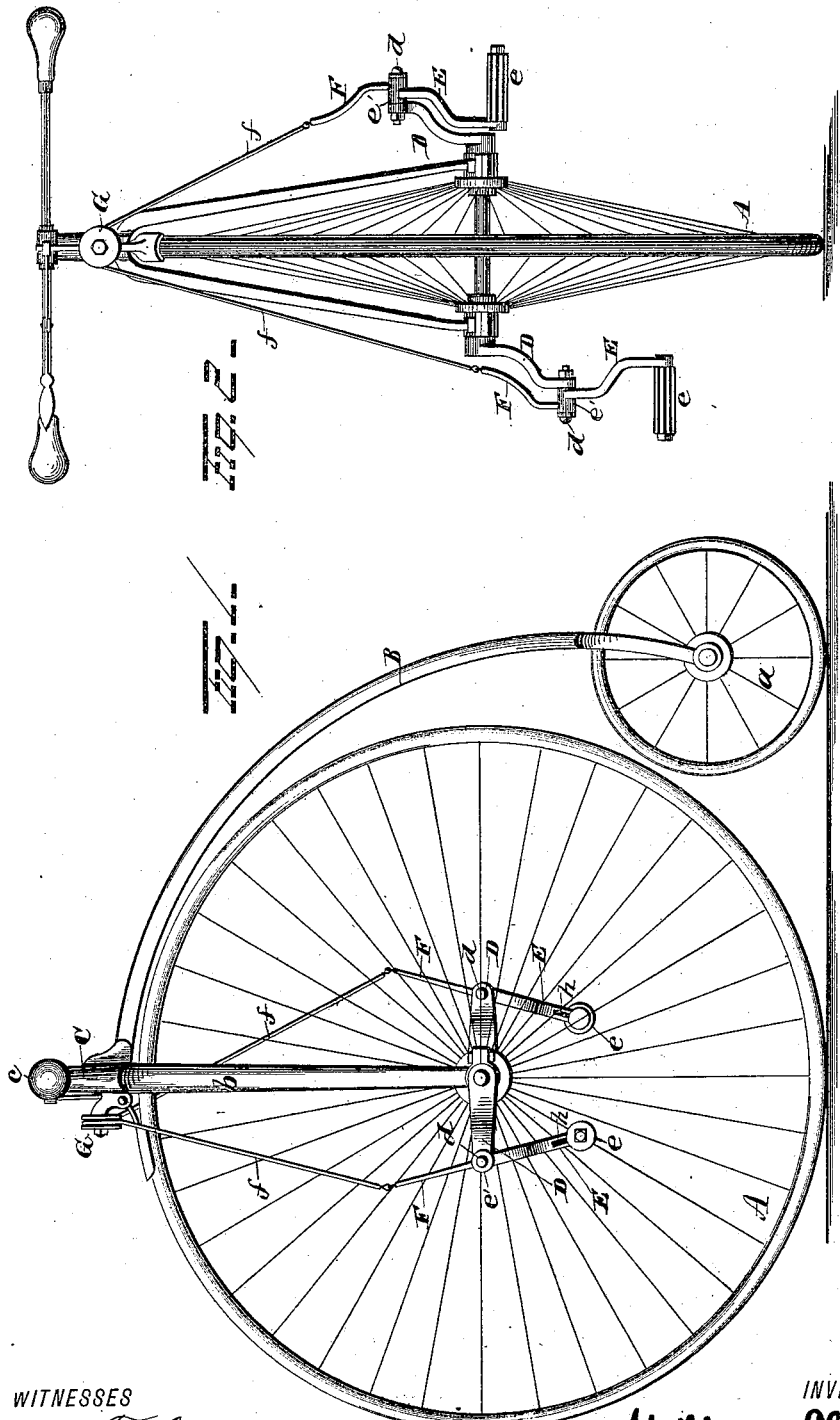
WITNESSES
George F. Downing
W. H. Ruff.
INVENTOR
William Clemson.
By H. A. Symons.
Attorney

UNITED STATES PATENT OFFICE.

WILLIAM CLEMSON, OF MIDDLETOWN, NEW YORK.

BICYCLE.

SPECIFICATION forming part of Letters Patent No. 316,009, dated April 21, 1885.

Application filed December 31, 1884. (No model.)

*To all whom it may concern:*

Be it known that I, WILLIAM CLEMSON, of Middletown, in the county of Orange and State of New York, have invented certain new and useful Improvements in Bicycles; and I do hereby declare the following to be a full, clear, and exact description of the invention, such as will enable others skilled in the art to which it appertains to make and use the same.

My invention relates to an improvement in bicycles.

Hitherto the object of inventors has been to obtain pedal mechanism whereby a larger wheel might be employed than the ordinary crank would admit of. It has been found, however, by experience that while the expert can use the tall wheel successfully, the mass of people who use the bicycle as a means of conveyance in the ordinary routine of travel to and from business prefer to use a small wheel, both for safety and convenience.

The object of my present invention is to provide pedal mechanism by means of which a wheel may be conveniently used of less diameter than could be employed by the use of the ordinary crank, without causing the legs of the rider to interfere with the handle-bar, a further object being to provide pedal mechanism adapted to admit of the use of a smaller wheel than the ordinary crank will admit of without increasing the area of frictional contact; and with these ends in view my invention consists in a pendent pedal journaled on the crank-pin.

My invention further consists in a pendent pedal journaled on the crank-pin and adapted to receive the foot-pressure in a vertical line with the crank-pin.

My invention further consists in pendent pedals journaled on the crank-pins and connected by an elastic tie for steadying the pedals when not in engagement with the feet.

My invention further consists in certain features of construction and combinations of parts, as will be hereinafter described, and pointed out in the claims.

In the accompanying drawings, Figure 1 is a view of a bicycle embodying my invention, and Fig. 2 is a vertical transverse section.

A indicates the large wheel, $a$ the small wheel, B the backbone, $b$ the fork, C the fork-head, and $c$ the handle-bar, of a bicycle constructed in any of the ordinary forms now known.

Crank-arms D are rigidly secured to the axle of the large wheel, and curve outwardly as they extend laterally therefrom. The outward curve mentioned is for the purpose of bringing the pendent pedal in a vertical line or plane with the crank-pin $d$, secured in a horizontal position in the end of the crank-arms D.

E represents the pendent pedal-arms, provided with the foot-rest $e$ at its lower end, and with the sleeve $e'$ at its upper end, by means of which latter it is journaled on the crank-pin $d$. The shank of the pendent pedal E is curved inwardly to conform nearly or quite to the curve of the crank-arms D, and the center of the foot-rest $e$ is thus brought in the same, or nearly the same, vertical plane with the center of the crank-pin $d$. The sleeves $e'$ are provided with upwardly-extending inwardly-curved prongs F, which are connected by an elastic tie, $f$, passing over a pulley or roller, G, loosely mounted and secured to the head C. The sole object of the tie $f$ is to hold the pedals steady, as in coasting or when the rider is about to mount. It is necessary that the tie $f$ should be slightly elastic, as the distance between the ends of the prongs over the pulley G is somewhat greater when the cranks D stand horizontally than when they stand vertically.

The shanks of the pendent pedals may be longer or shorter to suit wheels of different sizes, and are conveniently provided with slots $h$ at their lower ends, to admit of a vertical adjustment of the foot-rests therein. The machine as thus constructed admits of the use of a small wheel without cramping the legs of the rider, and may be used with or without the elastic tie connecting the prongs of the pendent pedals. When used without, there is no frictional contact in the pedal mechanism except that found in the ordinary crank machine—namely, the rocking motion of the sleeve $e'$ in the crank-pin $d$. The body of the rider is brought nearer the ground, his equilibrium thereby more readily established, and the liability to injury from falls lessened.

It is evident that the shape of the crank and pedal-shank may be changed from that shown, and that the pedals may be held steady by other means than the flexible elastic tie shown and described without departing from the spirit and scope of my invention; hence I do not wish to limit myself strictly to the construction herein set forth; but, Having fully described my invention, what I claim as new, and desire to secure by Letters Patent, is—

1. In a bicycle, the combination, with a large wheel and axle, the latter provided on its ends with the outwardly-curved crank-arms, of the pedal-arms journaled to said crank-arms and curved to conform to the shape of said crank-arms, substantially as shown.

2. The combination, with cranks secured on the ends of the large wheel-axle and pendent pedals journaled thereon, of an elastic tie connecting the pendent pedals, and adapted to hold the same steady when not engaged by the foot, substantially as set forth.

3. The combination, with a pair of cranks secured on the ends of the large wheel-axle and curved outwardly therefrom, of a pair of pendent pedals journaled on the crank-pins, the shanks of said pendent pedals being curved inwardly to conform, or nearly so, to the shape of the cranks, and an elastic tie passing over a pulley secured to the head and connecting the upper ends of the pendent pedals, substantially as set forth.

In testimony whereof I have signed this specification in the presence of two subscribing witnesses.

WILLIAM CLEMSON.

Witnesses:
C. I. HUMPHREY,
W. K. STANSBURY.